April 5, 1960

C. J. DAVIS 2,931,525

MOUNTING APPARATUS FOR TRACTOR ATTACHMENTS

Filed Oct. 15, 1956

CHARLES J. DAVIS
*INVENTOR.*

BY
ATTORNEY

United States Patent Office 2,931,525
Patented Apr. 5, 1960

2,931,525
MOUNTING APPARATUS FOR TRACTOR ATTACHMENTS

Charles J. Davis, Wichita, Kans., assignor, by mesne assignments, to Massey-Ferguson Inc., a corporation of Maryland Application October 15, 1956, Serial No. 616,022

2 Claims. (Cl. 214—132)

This invention relates generally to apparatus for mounting various attachments to the rear end of a tractor.

One important object of the invention is to provide supporting apparatus for tractor attachments that will not damage the tractor's frame when heavy overhanging loads are imposed upon the attachment. For instance, when the attachment constitutes a mechanical shovel, trouble has heretofore been experienced with bending and breaking of the tractor's frame. In such prior art devices the forces from heavy loads are transmitted to the vehicle's underframe adjacent the rear axle thereof. This produces an extreme counterclockwise torque. Because the weight of the engine is forward, breakage of the tractor's frame has occurred between axles. An aim of the present invention is to obviate this happening.

Another object is to provide mounting apparatus for various tractor attachments that can be quickly fastened or removed from the tractor.

Another object is to provide apparatus of the foregoing character that can be dismantled to such an extent that it occupies little space when being stored.

A further object is to provide mounting apparatus for tractor attachments that will be sturdy and rugged, yet lightweight and inexpensive in its construction.

Figure 1:
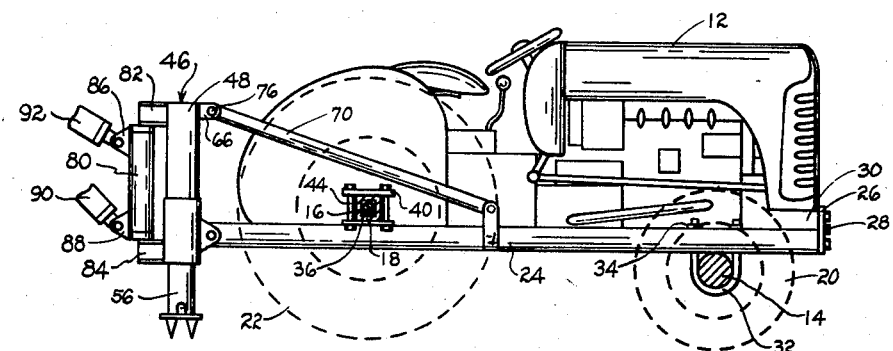
Figure 2:
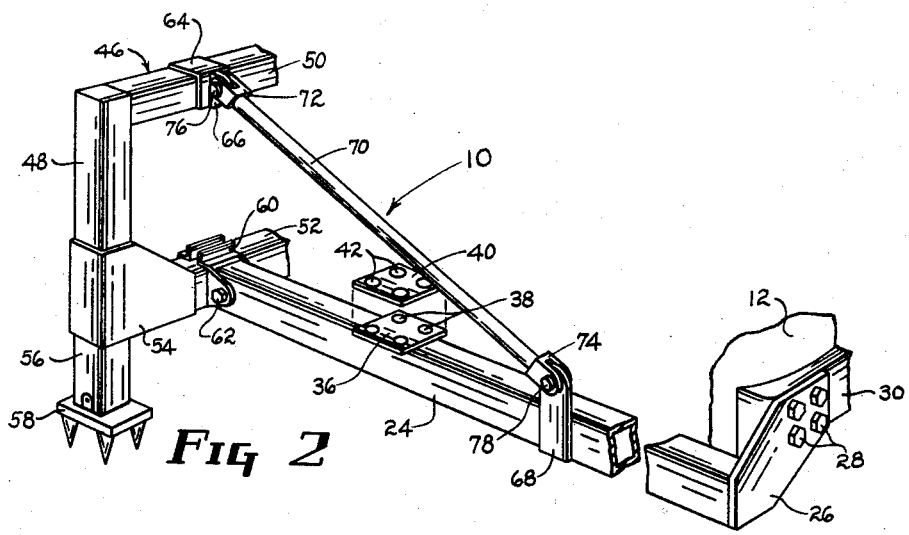

The invention, together with other objects attending its production, will be more clearly understood when the following description is read in connection with the accompanying drawing, in which:

Figure 1 is a side elevational view of the improved mounting apparatus actually installed on a tractor, and Figure 2 is a fragmentary perspective view of the mounting apparatus with only a small portion of the tractor's forward end appearing.

The mounting apparatus forming the subject matter of the instant invention has been generally designated by the numeral 10. It is fastened to a tractor 12 having a forward axle 14 and a rear axle 16, the rear axle being contained in an axle housing 18 which is an integral part of the tractor frame. The axle 14, the axle 16 and its housing 18 appear in section because the apparatus 10 is secured inwardly of the front and rear wheels. Consequently the front and rear wheels have been depicted only in phantom outline, bearing the identifying numerals 20 and 22, respectively.

The mounting apparatus 10 includes a pair of horizontal side members 24. To the forward end of each member 24 is welded an inwardly directed bracket 26 having a plurality of apertures for the accommodation of a plurality of bolts 28. These bolts 28 threadedly engage each end of a forward cross member 30 of the tractor frame.

The mounting apparatus 10 also is clamped to the front axle 14 by a U-bolt 32 passing through each member 24, and secured by a pair of nuts 34.

Each horizontal side member 24 is also clamped to the rear axle housing 18. This is done by means of a bracket 36 welded or bolted to each horizontal member 24. As can be seen in Fig. 2, the bracket 36 has a plurality of apertures 38. Similar to the bracket 36 is an upper plate 40 having an equal number of apertures 42. The actual clamping action is derived from a plurality of bolts 44 passing through the apertures 38 and 42 to thereby clamp the elements 36 and 40 against the top and bottom surfaces of the axle housing 18. It will be noted that the "U-bolts" which clamp the side members to the front axle and the bracket plate arrangement clamping the rear axle to the side members both encircle the respective axles without any axle modification while permitting the apparatus to be readily disengaged from the tractor when desired.

It will be understood that the side members 24 may be of any desired length so that they project aft of the rear tractor wheels a desired distance.

While the apparatus 10 which constitutes the invention may be utilized in supporting various types of attachments at the rear end of a tractor, the drawings illustrate the apparatus serving to attach a mechanical shovel to the tractor, only a portion of the mechanical shovel being shown. A complete showing of the type of mechanical shovel used is disclosed in the Davis Patent No. 2,834,489.

That portion of the mechanical shovel shown comprises an upright transverse rectangular frame 46 which includes a pair of vertical side members or posts 48 and a pair of vertically spaced transverse frame members 50 and 52, all of which are rigidly secured to each other as by welding. The upright side posts 48 house vertically movable hydraulically actuated legs 56 which serve to level the frame structure of the shovel with respect to the ground.

Intermediate their ends the shovel cross members 50 and 52 support a boom swivel post 80 between upper and lower cantilever beams 82 and 84. The swivel post supports the lower end of a boom 90, and at its upper end the swivel post supports the inner end of a boom actuating hydraulic cylinder 92.

The aft end of each side member 24 is rigidly secured to the shovel cross member 52 by means of brackets 60 which are welded or bolted to the cross member. Each bracket 60 includes a pair of spaced ears between which the aft ends of the side member 24 are received. A bolt 62 passes through the ears and through the side member 24 to securely anchor the shovel frame.

As shown in the drawing, the transverse frame members 50 and 52 extend laterally outward beyond the points of connection with the side members 24. Thus the posts 48 at the ends of the transverse members are spaced outwardly to provide outboard support for the legs 56 and the feet 58 which engage the ground. It will be apparent to one skilled in the art that this provides lateral stability, particularly when the connected shovel is swung to one or the other of its side positions. This stability is achieved without the necessity for auxiliary, outwardly extending, ground engaging arms.

In addition, the upper cross member 50 of the shovel is provided with a pair of laterally spaced brackets 64 which include an ear 66. Intermediate its ends each side member 24 is provided with an upstanding plate 68 which is welded or otherwise suitably secured to the side member. A pair of links 70 each has one of its ends secured to one plate 68 by means of a pin 73, and has its other end secured to an ear 66 by means of a pin 76.

With the described attachment mounting apparatus 10 secured to the tractor and to the mechanical shovel frame 46 in the described manner, the reaction force created by the lifting of a heavy load by the shovel boom 90 tends to rotate the entire shovel frame 46 counter-clockwise about the transversely aligned connecting bolts 62. This force is transmitted by links 70 through plates 68 directly to the two side members 24. Side members 24 distribute this force to the front axle 14, to the forward end of the tractor frame at 30, and to the rear end of the tractor frame through axle housing 18. Note that none of this force is transmitted to any intermediate point on the tractor frame. Hence, there is no applied bending load, and the possibility of tractor frame breakage due to the shovel operation is eliminated.

It will be understood that the pins or bolts 62, 76 may be used to attach other types of attachments to the tractor frame through the side members 24 and the links 70.

Having described the invention with sufficient clarity to enable those familiar with this art to construct and use it, I claim:

1. A mounting apparatus for tractor attachments comprising: a pair of rigid elongated horizontal side members; bracket means for connecting the forward ends of said horizontal side members to a forward cross member of the tractor frame; a pair of U-bolts for attaching said side members to the upper side of the forward axle of the tractor; respective means for attaching said side members to the under side of the rear axle housing of the tractor including a bracket secured to the upper side of each side member, a plate element for each side member and a plurality of bolts for clamping said plate elements against the upper side of the rear axle housing and the brackets against the under side of said rear axle housing; an attachment at the rear of the tractor including a pair of vertical side members and a pair of transverse members connected at different elevations to said vertical side members; means connecting the rear ends of said horizontal side members to the lower of said transverse members; a pair of inclined link elements; means connecting the forward ends of said link elements to a point on said horizontal side members intermediate the forward and rear axles of the tractor; and means connecting the rear ends of said link elements to the upper of said transverse members.

2. In combination with a tractor having a rear axle and a longitudinal frame, an attachment comprising a pair of rigid, elongated side members arranged horizontally alongside said tractor frame, brackets rigidly secured at the front ends of said side members adjacent the front end of said tractor frame, means for detachably securing said brackets to the tractor frame, clamps disengageably securing said side members to the rear axle housing of the tractor, said side members having portions extending beyond the rear of said tractor frame, an upright attachment frame releasably locked on the rearwardly extending portions of said side members, a pair of rigid links each secured at one end to a respective one of said side members intermediate the ends of the latter, the other end of said links being releasably locked to the upper portion of said attachment frame so as to rigidly support the latter in its upright position on said side members, said attachment frame extending laterally a substantial distance beyond said side members and carrying a retractable ground engaging member at each of the lateral extending ends of said attachment frame, and a horizontally swingable working tool support pivoted on said attachment frame, said ground engaging members at the lateral ends of said attachment frame giving good lateral stability for said swingable tool support and also providing support points for the attachment frame so that the tractor can be easily separated from the attachment frame by simply driving the tractor away after releasing the four releasable connections locking the attachment frame to the side members and the links.

References Cited in the file of this patent
UNITED STATES PATENTS

| | | |
|---|---|---|
| 1,498,690 | Hunziker | June 24, 1924 |
| 1,774,656 | Miller | Sept. 2, 1930 |
| 1,930,862 | Ross | Oct. 17, 1933 |
| 2,242,472 | Keeler | May 20, 1941 |
| 2,415,015 | Lull | Jan. 28, 1947 |
| 2,429,746 | Coldwell | Oct. 28, 1947 |
| 2,545,739 | Martin | Mar. 20, 1951 |
| 2,639,048 | Glashaw | May 19, 1953 |
| 2,702,137 | Ives | Feb. 15, 1955 |
| 2,788,906 | Davis et al. | Apr. 16, 1957 |

OTHER REFERENCES

Brochure, "Sherman Power Digger"; SP 485–IH; Sherman Products Inc., received Oct. 24, 1955.